(12) United States Patent
Huang et al.

(10) Patent No.: US 6,998,945 B2
(45) Date of Patent: Feb. 14, 2006

(54) RECEPTACLE DEVICE HAVING PROTECTION AGAINST ARC FAULTS AND LEAKAGE CURRENTS

(75) Inventors: Huadao Huang, Room 401, Block 4, JinGu Yuan, XiaLuPu, Wenzhou (CN); Huayang Lu, Wenzhou (CN)

(73) Assignee: Huadao Huang, Wenzhou (CN)

( * ) Notice: Subject to any disclaimer, the term of this patent is extended or adjusted under 35 U.S.C. 154(b) by 16 days.

(21) Appl. No.: 10/730,032

(22) Filed: Dec. 9, 2003

(65) Prior Publication Data

US 2005/0012575 A1    Jan. 20, 2005

(30) Foreign Application Priority Data

Jul. 17, 2003    (CN) ............................... 03277788 U

(51) Int. Cl.
*H01H 73/00* (2006.01)
(52) U.S. Cl. .......................................... 335/18; 361/42
(58) Field of Classification Search ................. 335/18; 361/42–51
See application file for complete search history.

(56) References Cited

U.S. PATENT DOCUMENTS

| | | | | |
|---|---|---|---|---|
| 4,851,951 A | * | 7/1989 | Foster, Jr. ..................... | 361/50 |
| 5,594,398 A | * | 1/1997 | Marcou et al. ............... | 335/18 |
| 6,392,513 B1 | * | 5/2002 | Whipple et al. .............. | 335/18 |

* cited by examiner

*Primary Examiner*—Lincoln Donovan
(74) *Attorney, Agent, or Firm*—Fei-Fei Chao; Bingham McCutchen LLP

(57) ABSTRACT

A receptacle device for protection against arc faults and leakage currents, including an arc fault test button, a leakage test button, and a reset button. Test resistors are arranged below the arc fault test button and the leakage test button wherein the test resistors are coupled to an electrical circuit board. The electrical circuit board includes an arc sampling resistor to detect arc faults and a leakage detection differential transformer to detect leakage currents. In order to provide good contacts between mobile and stationary electrical contacts of the receptacle device, a reset button bias member having mobile contact bridges at its two arms is provided. Each of the mobile contact bridges has three triangularly spaced electrical contacts, corresponding to stationary electrical contacts of flexible input fingers, output conductors and electrical output leads of the receptacle device. In order to balance the mobile contact bridges and provide better contacts, the receptacle device of the present invention can utilize a unique system of dual directional locks, i.e., below the reset button, there are two axially symmetrical directional locks provided within a reset button bias member of the receptacle device.

15 Claims, 14 Drawing Sheets

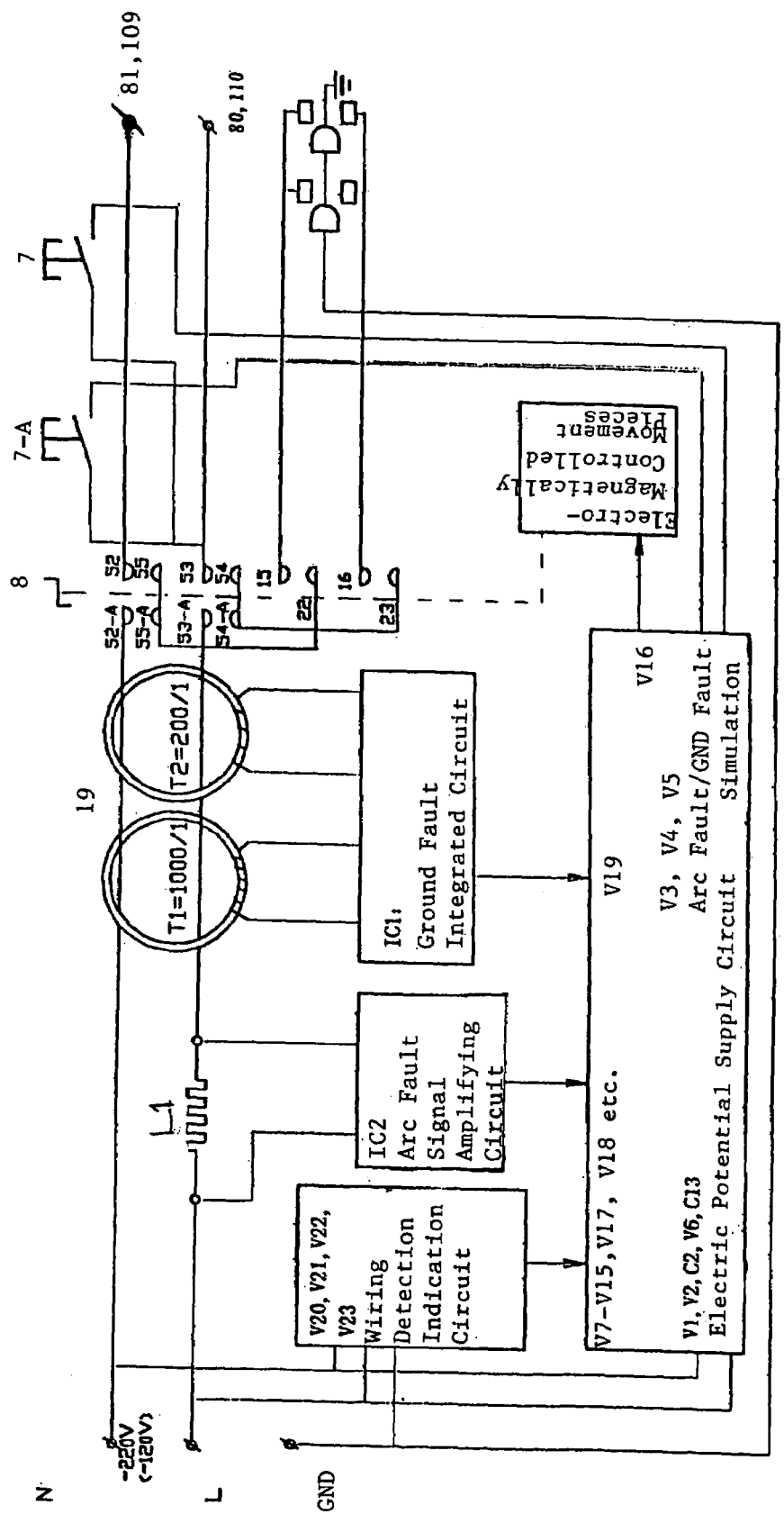

RECEPTACLE DEVICE HAVING PROTECTION AGAINST ARC FAULTS AND LEAKAGE CURRENTS

CROSS-REFERENCE TO RELATED APPLICATION

This application claims the priority of Chinese Patent Application No. 03277788.4, filed on Jul. 17, 2003, which is incorporated herein by reference in its entirety.

FIELD OF THE INVENTION

The present invention relates to a receptacle device capable of detecting and handling of arc faults and leakage currents (e.g., ground faults). Particularly, the present invention relates to a receptacle device for wall installations, which can be applied with a 220 V, 50 Hz power supply or a 110 V, 60 Hz power supply for detecting and handling of arc faults and leakage currents and performing multiple protective functions.

BACKGROUND OF THE INVENTION

As more electronic devices are used to improve and add convenience to our lives, there are greater risks of electrical hazards such as arc fires and electrical shocks (i.e., unwanted short circuits to ground) without having proper protection means. Most electrical receptacles used at homes have no protection against arc fires (often caused by overload usage) and short circuits (i.e., unwanted leakage currents to ground). Further, conventional receptacle devices with protection against leakage currents do not protect against arc fires and fail when the output ends of the receptacle device are mistaken for input ends and receive input wirings. Arc fires often occur from short circuits established between damaged electrical wires. After appliances, e.g., televisions, air conditioners, kitchen ventilation fans, etc., are operated at their full capacity for an extended period of time, various factors such as high temperature, high pressure and erosion, can cause the insulation of the appliance wires to deteriorate and make it easier to short circuit with each other or other components. If such short circuits are not detected and the electrical supply is not discontinued in a timely manner, arc faults caused by such short circuits can develop into major fire hazards. Thus, it is desirable to provide safe and reliable electrical receptacles capable of providing multiple protective functions such as protection against arc fires and leakage currents.

SUMMARY OF THE INVENTION

It is a feature of the invention to provide a receptacle device that avoids the previously mentioned disadvantages. It is a further feature of the present invention to provide a receptacle device with protection against arc faults and leakage currents which is adapted for wall installation, safe to use, and capable of auto-detecting arc faults and leakage currents and interrupting the electrical supply quickly to prevent electrical hazards.

Another feature of the present invention is to provide a receptacle device capable of blocking an electrical output when an electrical input line is mis-wired or reverse-wired. The receptacle device of the present invention guides users in wiring electrical input lines of the receptacle device properly. When electrical input lines and output lines of the receptacle device are reverse-wired, or the phase line (i.e., the "HOT line") and the ground line are reverse-wired, or the safety zero line is not wired to the receptacle device, the receptacle device of the present invention blocks an electrical output of the device. Only when the receptacle device is properly wired and reset, will the output ends of the receptacle device have an electrical output. The above described features of the receptacle device can aid its installer to properly wire the receptacle device and can protect against potential electrical hazards.

Another feature of the present invention can be to provide for emergency operations such as providing a forced electrical supply or a forced interruption.

The above and other features and advantages are achieved by a receptacle device for protection against arc faults and leakage currents, including an upper cover, an intermediate support, a base, a mounting strap installed between the upper cover and the intermediate support, and an electrical circuit board installed between the intermediate support and the base. The upper cover includes electrical output plugs, an arc fault test button, a leakage test button and a reset button, wherein the arc fault test button, the leakage test button and the reset button can pass through the mounting strap and contact components on the electrical circuit board. The mounting strap can include ground points and, at one side of the mounting strap, a ground line input screw, wherein the ground points are safety ground receptacles of the electrical output plugs on the upper cover. The intermediate support can include a pair of output conductors, wherein the output conductors can further include conductive members and stationary electrical contacts, the conductive members can correspond to the phase line openings and neutral line openings of the electrical output plugs on the upper cover, and the electrical contacts can be situated like mirror images to each other.

The base can include a symmetrically situated pair of electrical input coupling screws, pair of electrical output screws and pair of electrical output leads, wherein the base can be used as a housing to enclose the intermediate support and the electrical circuit board, the electrical output leads can be coupled to the electrical output screws, and the electrical output leads further include electrical contacts. The electrical circuit board can include a pair of flexible input fingers, a leakage detection differential transformer for detecting leakage currents, an arc sampling resistor for detecting arc faults, and a reset button bias member and a solenoid coil having a plunger therein, wherein the flexible input fingers can be coupled to electrical input coupling screws.

The flexible input fingers can pass through the leakage detection differential transformer and can be coupled to the electrical input coupling screws. The arc sampling resistor can be linked in series with an electrical input phase line. The reset button bias member is located underneath the reset button and may include mobile contact bridges at its two arms, and two central openings extending from a top of the reset button bias member, wherein the central openings enclose a pair of column-shaped directional locks having springs on the outside, wherein the directional locks are coupled to a bottom of the reset button, wherein the directional locks have smooth bottom surfaces and locking grooves near a bottom of the directional locks, wherein a movable, horizontal, metal, electromagnetic latch is arranged underneath the directional locks and near the bottom of the central openings, the latch includes two openings corresponding to the directional locks, a spring is provided between one side of the reset button bias member and the latch, and the plunger rests at a top portion of the latch. Each of the mobile contact bridges of the reset button bias member has three triangularly spaced electrical contacts, wherein one electrical contact couples to a stationary electrical contact on a respective flexible input finger, wherein the other two electrical contacts couple with stationary electrical contacts on a respective output conductor of the intermediate support and a respective electrical output lead of the base to control an electrical supply of the electrical output plugs and the electrical output ends on the upper cover.

The reset button can include an extension pointing downwards and a nub at a bottom end of the extension, wherein the nub can be in contact with a first end of a moving arm of a testing switch on the intermediate support, wherein the first end of the moving arm can be shaped into a curl. A test resistor is provided underneath the testing switch, wherein one end of the testing switch can be coupled to components controlling the conduction/interruption of the solenoid coil having the plunger therein, wherein the other end of the testing switch can be coupled to the electrical circuit board through the test resistor. The leakage test button can include an extension pointing downwards and sideways, wherein the extension can be in contact with a tail of the latch. A pair of elastic test button switch pieces can be provided underneath the arc fault test button and the leakage test button, wherein test resistors can be further provided underneath the test button switch pieces, first ends of the test button switch pieces can be coupled to the plug phase line, and second ends of the test button switch pieces can be suspended for subsequently being coupled to the test resistors. The test resistor underneath the arc fault test button can be coupled to a control end of an arc fault detection circuit on the electrical circuit board and the test resistor underneath the leakage test button can be coupled to a control end of a leakage detection circuit on the electrical circuit board.

An upper portion of the directional locks can have a diameter slightly larger than a diameter of a lower portion of the directional locks, and springs can wrap around the lower portion of the directional locks, wherein the springs can bias the reset button to spring upward after the latch releases the directional locks. A pair of compressed contact balance springs having elasticity stored therein can be provided within the reset button bias member at positions underneath the gravity centers of the mobile contact bridges. The leakage detection differential transformer can include two differential transformers. For example, the leakage detection differential transformer can include a high frequency industrial silicon steel differential transformer and a ferrite differential transformer of high frequency. The upper cover can further include indicator lights coupled to the electrical circuit board.

The receptacle device according to the present invention can protect against arc faults and leakage currents, and can be easier to install, safer to use and more reliable than conventional receptacle devices.

BRIEF DESCRIPTION OF THE DRAWINGS

The foregoing description of the invention will be apparent from the following, more particular description of embodiments of the invention, as illustrated in the accompanying drawings, wherein like reference numbers generally indicate identical, functionally similar, and/or structurally similar elements.

FIG. 5-1 is a cross-sectional view of the exemplary receptacle device in FIG. 3 along the line A—A, showing the left section of the exemplary receptacle device before being reset.

FIG. 5-2 is a cross-sectional view of the exemplary receptacle device in FIG. 3 along the line A—A, showing the left section of the exemplary receptacle device after being reset.

FIG. 5-3 is a cross-sectional view of the exemplary receptacle device in FIG. 3 along the line A—A, showing the right section of the exemplary receptacle device before being reset.

FIG. 6-1 is a cross-sectional view of the exemplary device in FIG. 3 along the line B—B, showing the exemplary receptacle device before being reset.

FIG. 6-2 is a cross-sectional view of the exemplary device in FIG. 3 along the line B—B, showing the exemplary receptacle device after being reset.

FIG. 6-3 is a cross-sectional view of the exemplary device in FIG. 3 along the line C—C, showing the exemplary receptacle device before being reset.

FIG. 6-4 is a cross-sectional view of the exemplary device in FIG. 3 along the line C—C, showing the exemplary receptacle device after being reset.

FIG. 7 is a circuit diagram of the exemplary receptacle device according to the present invention.

DETAILED DESCRIPTION OF AN EXEMPLARY EMBODIMENT OF THE INVENTION

Figure 1:
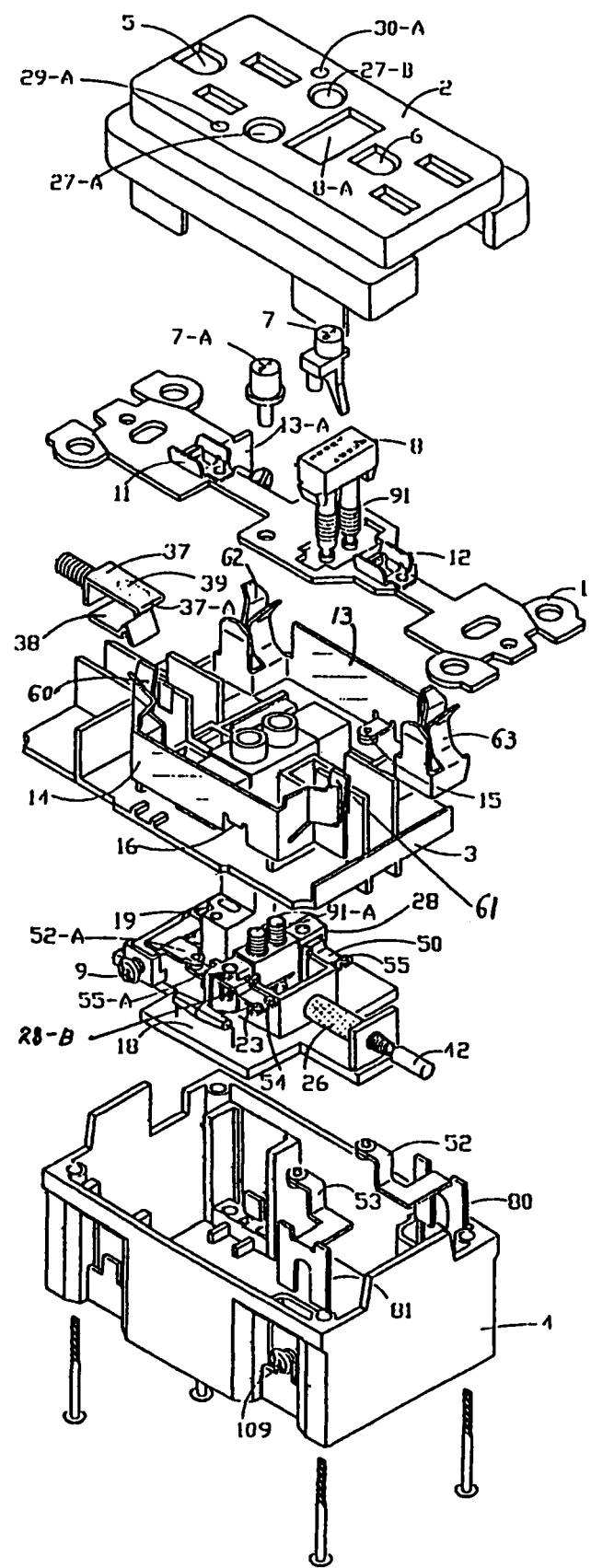
FIG. 1 is a three-dimensional exploded view of the receptacle device according to an exemplary embodiment of the present invention.

In FIG. 1, an exemplary receptacle device protecting against arc faults and leakage currents according to an exemplary embodiment of the present invention includes an upper cover 2, an intermediate support 3, and a base 4 assembled together. A mounting strap 1 is installed between the upper cover 2 and the intermediate support 3. An electrical circuit board 18 is installed between the intermediate support 3 and the base 4.

Figure 2:
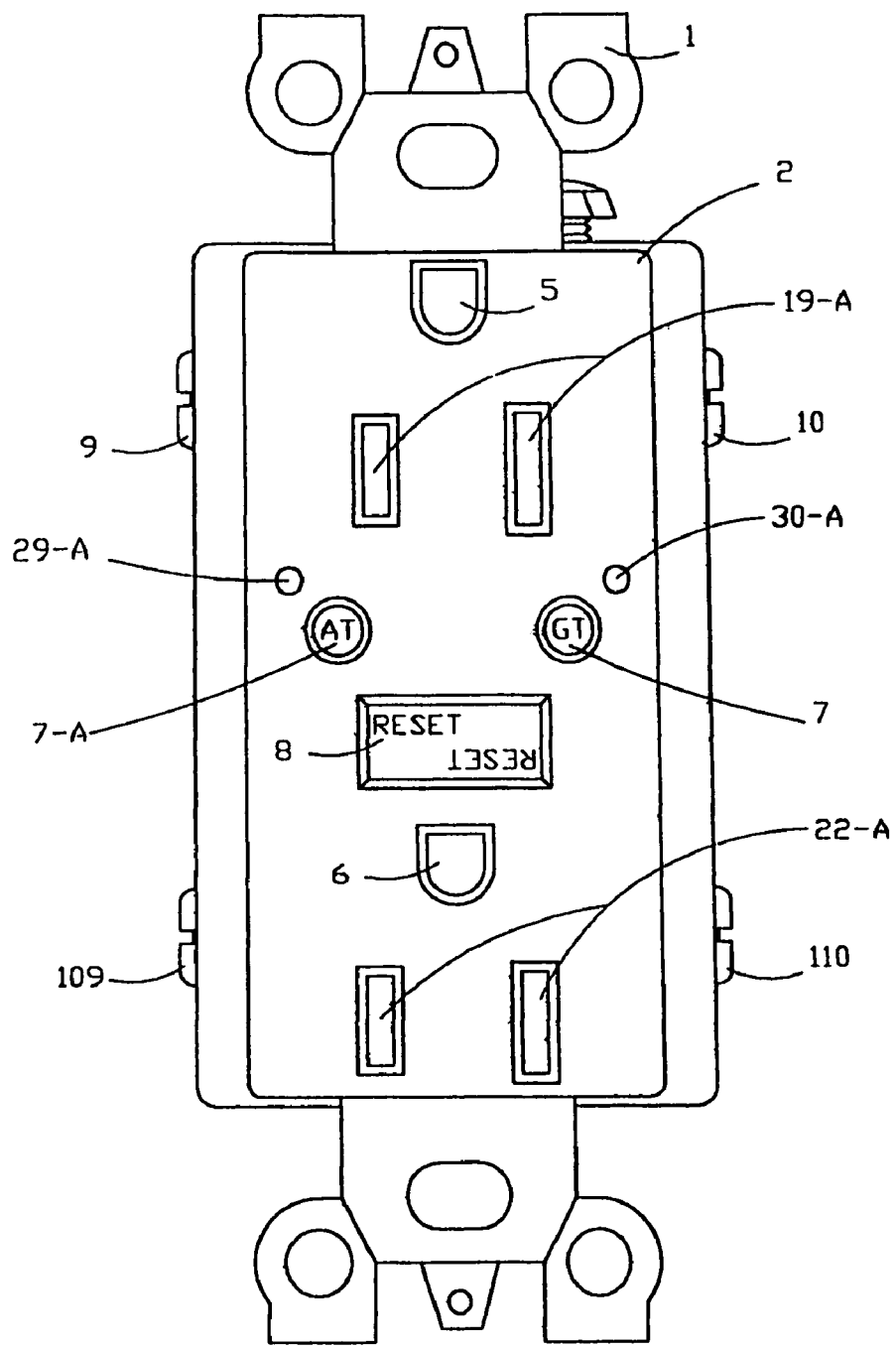
FIG. 2 is a top view of the exemplary receptacle device.

In FIGS. 1 and 2, the upper cover 2 includes in an exemplary embodiment two electrical output plugs 5, 6, a square reset button (RESET) 8, two axially symmetrically located test buttons 7-A and 7 (i.e., an arc fault test button and a leakage test button GT, respectively) adjacent to the reset button 8, openings 27A, 27B for the test buttons, an opening 8-A for the reset button, and two indicator lights 29-A, 30-A. The reset button 8, the arc fault test button 7-A and the leakage test button 7 pass through the mounting strap 1 and the intermediate support 3 to contact with components of the electrical circuit board 18, which are installed inside the base 4 according to FIG. 1.

The mounting strap 1 can be installed between the upper cover 2 and the intermediate support 3. As shown in FIG. 1, the mounting strap 1 has four holes at its four corners for installation and four breakable grooves to meet different installation requirements. The mounting strap 1 can also have ground points 11, 12 to serve as the safety ground receptacles of the electrical output plugs 5, 6. The upper side of the mounting strap 1 can be provided with a ground line input screw 13-A, which is installed at a side of the outer cover.

Figure 3:
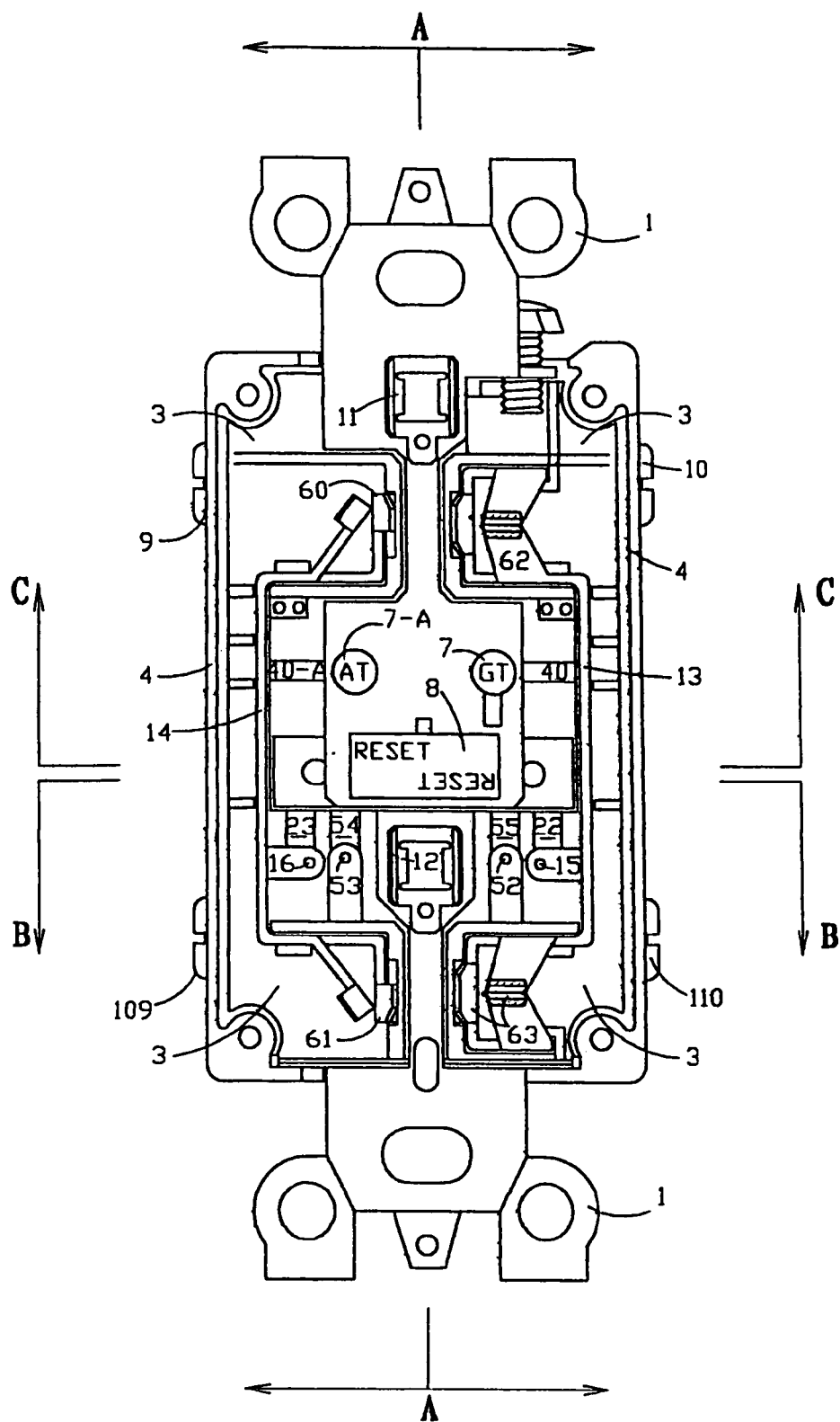
FIG. 3 is a top view of the exemplary receptacle device without an upper cover.
Figure 4:
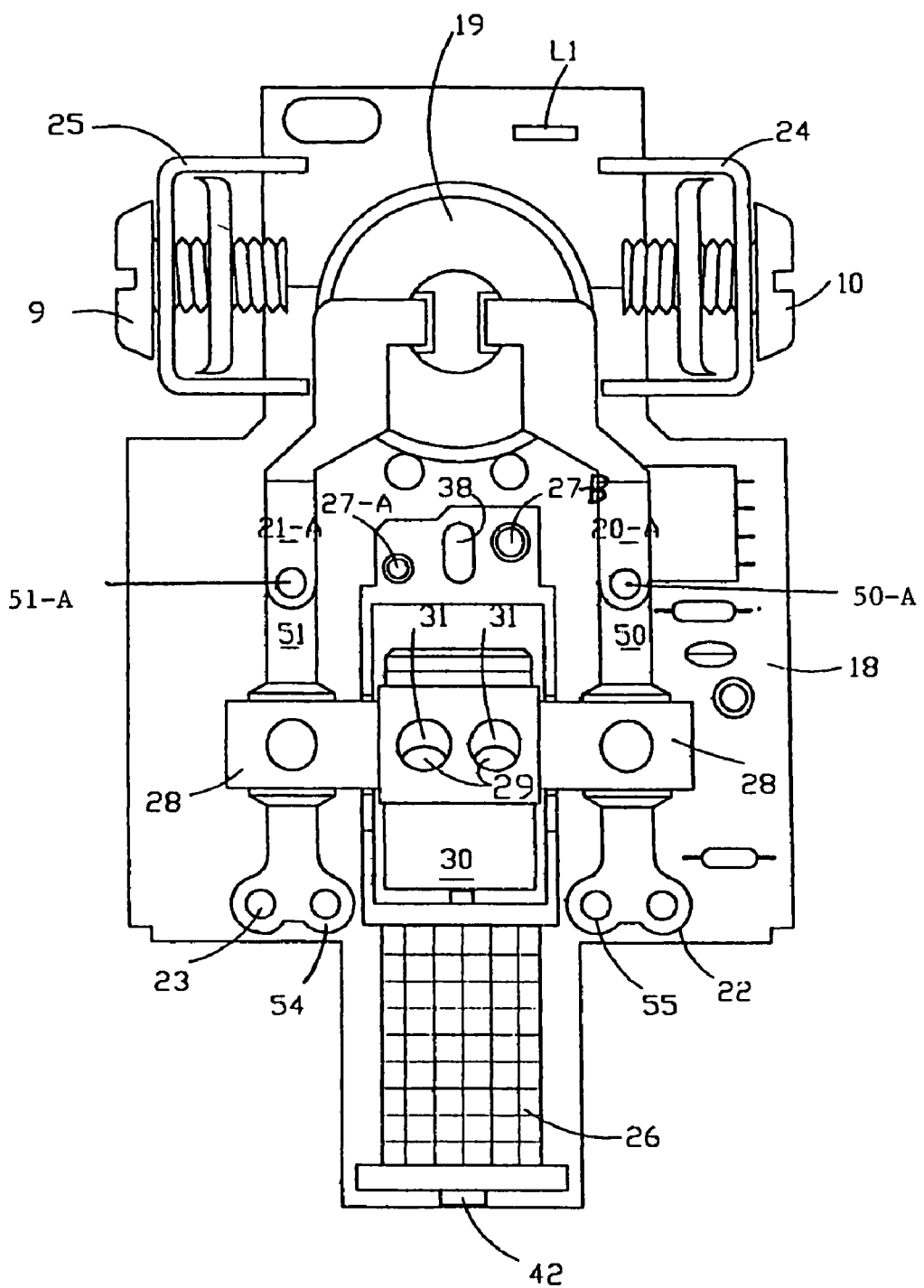
FIG. 4 is a top view of electrical components on an exemplary electrical circuit board according to the present invention.

In FIGS. 1 and 3, the intermediate support 3 includes a pair of "≡"-shaped output conductors 13, 14. The two output conductors 13, 14 can have conductive members 60–63 corresponding to the "HOT" phase line openings and "WHITE" neutral openings of the electrical output plugs 5, 6 on the upper cover 2. Additionally, the output conductors 13, 14 can include stationary electrical contacts 15, 16, respectively, that are situated like mirror images to each other. The two stationary electrical contacts 15, 16 correspond to the mobile electrical contacts 22, 23 (as also shown in FIG. 4) on the mobile contact bridges 50, 51, which can be fixed on the electrical circuit board 18, forming two pairs of switch structures. Further, the mobile contact bridges 50, 51 can be coupled to the stationary electrical contacts on the flexible input fingers 20-A, 21-A to provide electricity to the electrical output plugs 5, 6.

In FIGS. 1 and 4, the base 4 can be used as a housing to enclose the intermediate support 3 and the electrical circuit board 18. Two sides of the base 4 include, respectively, a pair of electrical input coupling screws 9 (HOT) and 10 (WHITE) and a pair of electrical output coupling screws 109 (HOT) and 110 (WHITE), coupled in parallel. A pair of input leads 24, 25 is inserted into and soldered to the electrical circuit board 18. Inside the base 4, a pair of electrical output leads 81 and 80 is coupled to the electrical output coupling screws 109 (HOT) and 110 (WHITE), respectively. The electrical output leads 80 and 81 have two electrical contacts 52 and 53, respectively. The electrical contacts 52, 53 of the electrical output leads 80, 81 are coupled to the electrical contacts 55, 54 on the mobile contact bridges 50, 51, respectively.

Further, the mobile contact bridges 50, 51 can be coupled to the stationary electrical contacts on the flexible input fingers 20-A, 21-A to provide an electrical output to the electrical output coupling screws 110, 109. Thus, the exemplary receptacle device according to an exemplary embodiment of the present invention can provide an electrical output to the electrical output plugs 5, 6 on the upper cover 2 and to the electrical output coupling screws 109, 110 and can protect against arc faults and leakage currents.

The electrical circuit board 18 includes two flexible input fingers 20-A, 21-A, a leakage detection differential transformer 19 for detecting leakage currents, an arc sampling resistor L1 for detecting arc faults, and a reset button bias member 28 having a pair of mobile contact bridges 50, 51 therein. The flexible input fingers 20-A, 21-A can pass through the leakage detection differential transformer 19 and can be coupled to the electrical input coupling screws 9, 10. The arc sampling resistor L1 can be linked in series with an electrical input phase line L (not shown) and can be linked to the flexible input finger 20-A at one end and can be linked to the electrical input coupling screw 10 at the other end. In an exemplary embodiment of the present invention, the flexible input fingers 20-A, 21-A can pass through the center hole of the leakage detection differential transformer 19 and can be soldered onto a solder plate on the electrical circuit board 18. The solder plate on the electrical circuit board 18 allows the electrical input coupling screws 10, 9 to be coupled to the input leads 24, 25 by directly soldering the couplings onto the electrical circuit board 18. The arc sampling resistor L1 for detecting arc faults can be coupled in series between an electrical input phase line and a control circuit and arc fault signals can be transmitted to the control circuit directly for further processing.

Fixed at two ends of the reset button bias member 28 are two mobile contact bridges 50, 51 with each having three triangularly spaced electrical contacts. At one end, the mobile contact bridges 50, 51 have a pair of electrical contacts 55-A, 54-A (see FIG. 7) corresponding to the stationary electrical contacts on the flexible input fingers 20-A, 21-A. At the other end, the mobile contact bridges 50, 51 have two pairs of electrical contacts, 22, 23, 55, 54 (as shown in FIG. 3) for being coupled to the stationary electrical contacts 15, 16 on the output conductors 13, 14 and to the electrical contacts 52, 53 on the electrical output leads 80, 81, respectively. These features control the electrical supply to the electrical output plugs 5, 6 on the upper cover 2 and the electrical output coupling screws 109, 110.

Figures 1, 5:
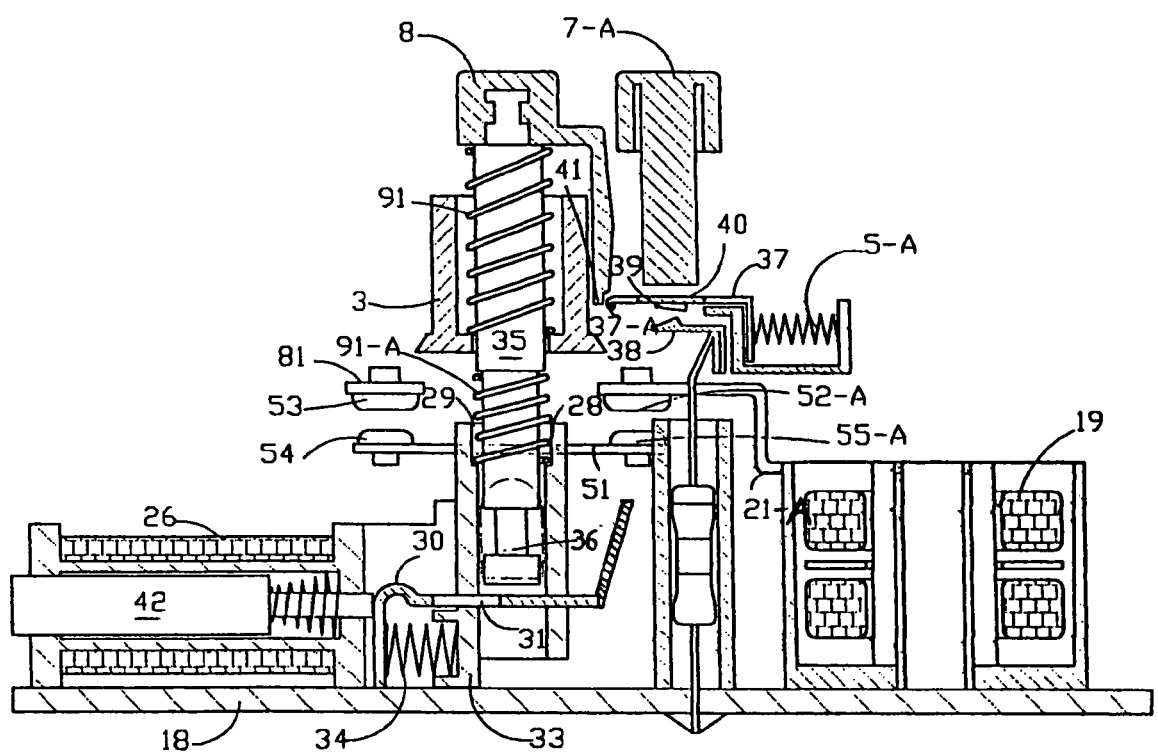
Figures 2, 5:
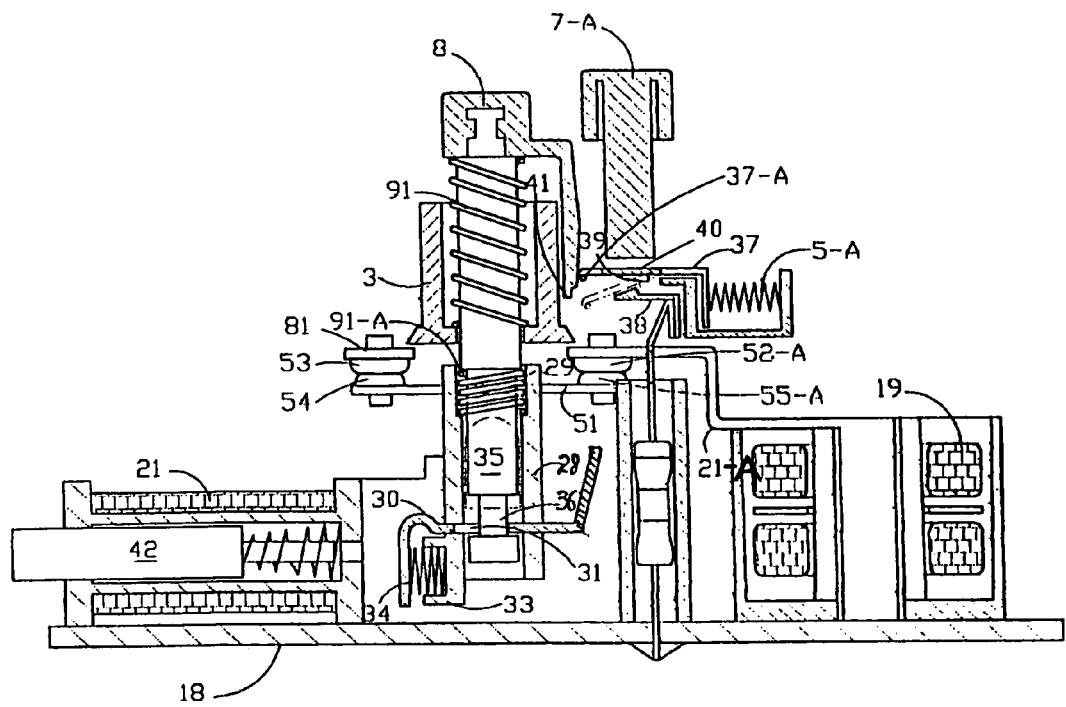
Figures 3, 5:
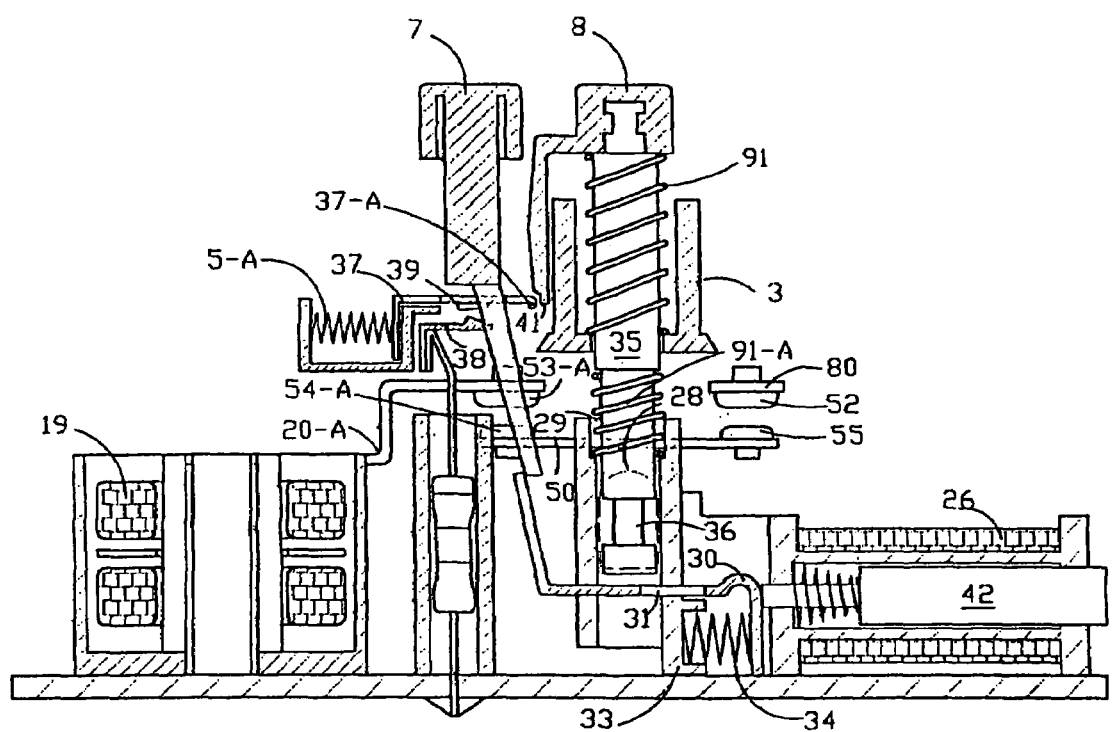
Figures 1, 6:
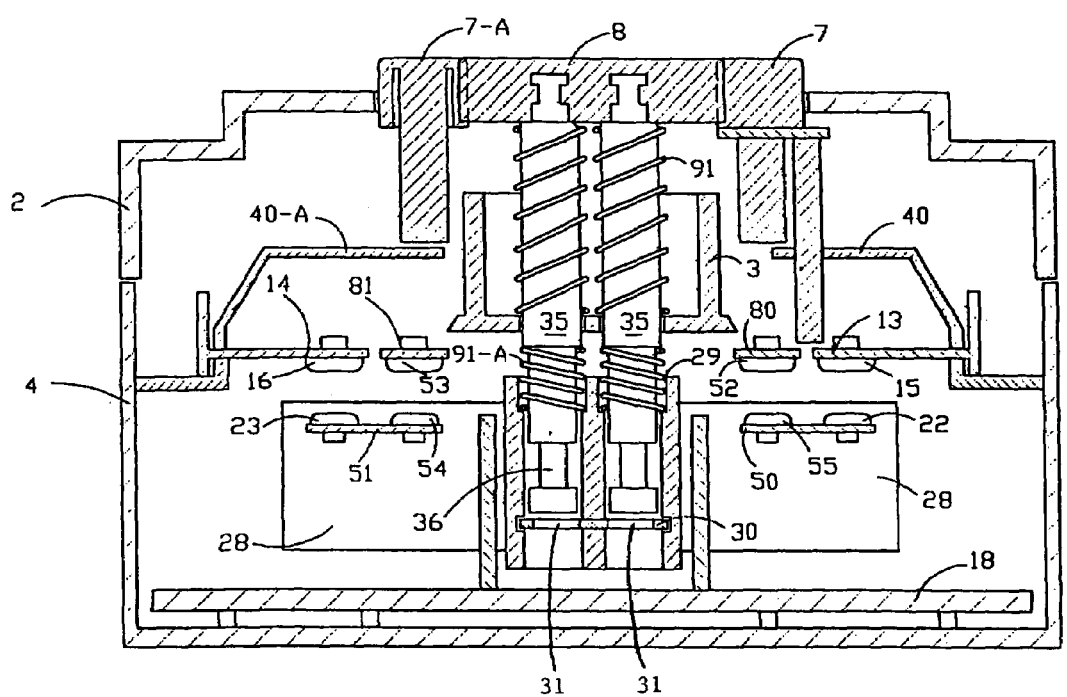
Figures 2, 6:
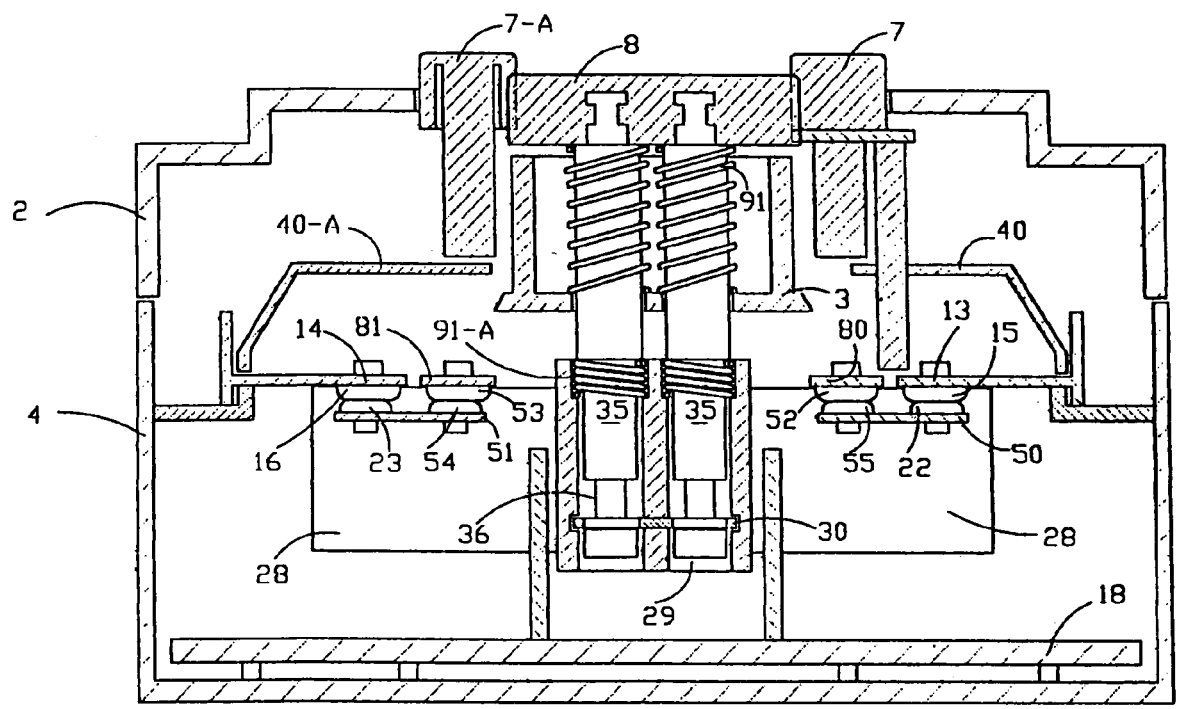
Figures 3, 6:
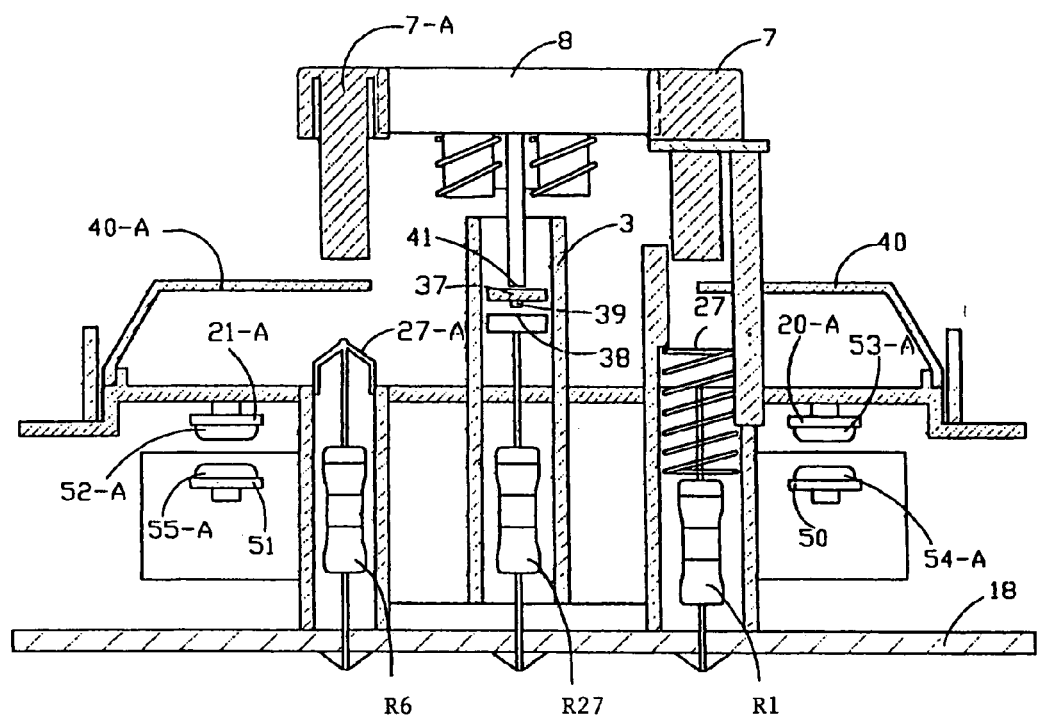
Figures 4, 6:
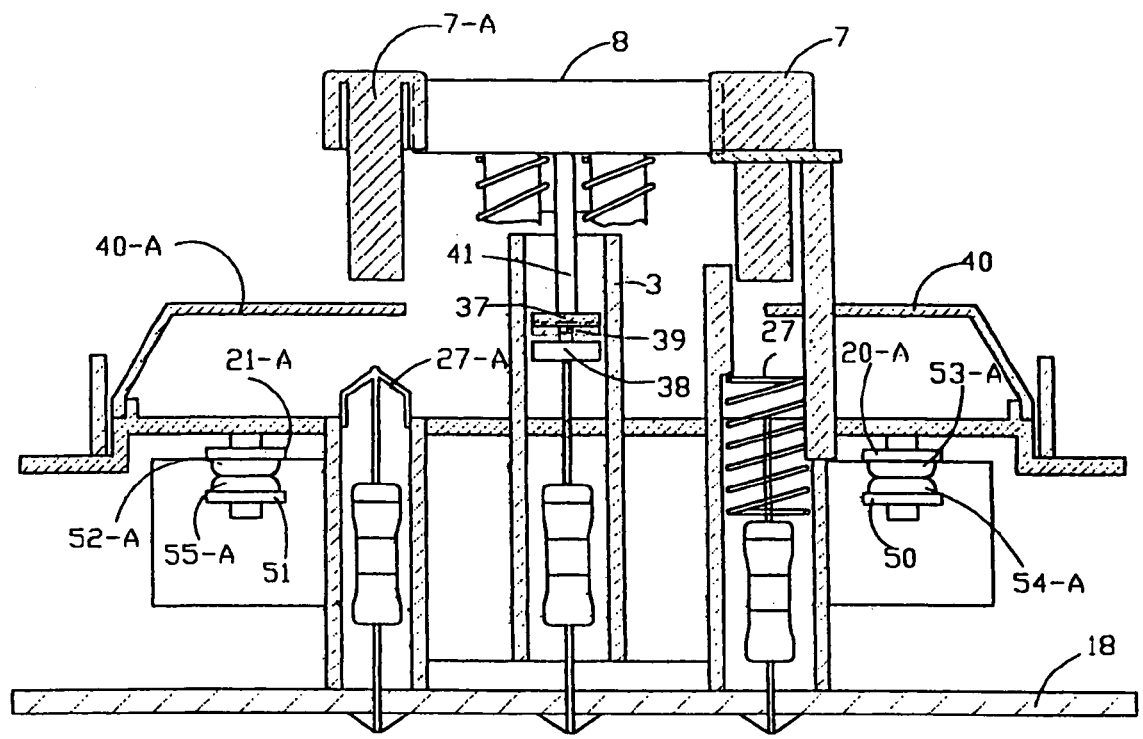

In FIGS. 5-1 and 6-1, the reset button bias member 28 is located underneath the reset button (RESET) 8 and has a long square body, and includes mobile contact bridges 50, 51 at its two arms and two central openings 29 at the top. A pair of column-shaped directional locks 35 having springs 91 wrapped around their outsides is housed in the central openings 29. One end of the directional locks 35 is coupled to the bottom of the reset button (RESET) 8. In order to balance the mobile contact bridges 50, 51 located at the two arms of the reset button bias member 28 and provide firm contacts with corresponding electrical contacts, the present invention includes a system of dual directional locks. The two axially symmetrically situated directional locks 35 are provided inside the reset button bias member 28. The diameters of the upper portions of the directional locks 35 are slightly larger than the lower portions. A pair of springs 91-A wraps around the outside of the lower portions of the directional locks 35 and can cause the reset button 8 to spring up after releasing the directional locks from the electromagnetic latch 33. When the reset button 8 is depressed, the two directional locks 35 underneath the reset button 8 move downwards and compress the springs 91-A. When the directional locks 35 move upwards, the springs 91-A release their elasticity and can rapidly decouple the mobile electrical contacts from the stationary electrical contacts. The directional locks 35 can have smooth bottom surfaces and locking grooves 36 near a bottom of the directional locks.

Underneath the directional locks 35, a movable, horizontal electromagnetic latch 30 (e.g., a "reverse z"-shaped latch) is arranged near the bottom of the central openings 29. At the center of the latch 30, two openings 31 corresponding to the directional locks 35 are provided. A circular groove 33 is provided on one side of the reset button bias member 28 between the reset button bias member 28 and a leg of the latch 30. The circular groove 33 has a spring 34 fitted therein. When the receptacle device is not to have an electrical output, the openings 31 on the latch 30 can be misaligned (i.e., offset) from the directional lock 35. There can be no contacts between the mobile contact bridges 50, 51 of the reset button bias member 28 and the flexible input fingers 20-A, 21-A. Thus, the receptacle device can have no electrical output. When the latch 30 is open (i.e., the latch 30 is pushed inward and the openings 31 align with the directional locks 35) and the reset button 8 is depressed, the directional locks 35 move downwards and pass through the latch 30 for subsequent latching by the latch 30. When the reset button 8 is released, the springs 91, 91-A on the outside of the directional locks 35 cause the directional locks 35 to move upwards and cause the reset button bias member 28 and the mobile contact bridges 50, 51 of the reset button bias member 28 to move upwards. The mobile electrical contacts on the mobile contact bridges 50, 51 can then be coupled with the stationary electrical contacts on the flexible input fingers 20-A, 21-A and electrical output leads 80, 81, providing electricity to the electrical output plugs 5, 6 on the upper cover 2 and the electrical output coupling screws 109, 110, hence enabling the electrical output. A solenoid coil 26 and a plunger 42 therein on the electrical circuit board 18 can control the movement of the latch 30.

In order to provide good contacts between the electrical contacts on the mobile contact bridges 50, 51 and the stationary electrical contacts on the flexible input fingers 20-A, 21-A, the output conductors 13, 14, and the electrical output leads 80, 81, the three electrical contacts on each of the mobile contact bridges 50, 51 can be in a triangular arrangement. In addition, a pair of compressed contact balance springs 28-B having a certain amount of elasticity stored therein can be provided within the reset button bias member 28 at the positions underneath the gravity centers of the mobile contact bridges 50, 51 (see FIG. 1). Thus, during reset (i.e., when the reset button 8 is depressed and the mobile electrical contacts and the stationary electrical contacts close), the three "points of contact" between the mobile electrical contacts of each mobile contact bridge and the stationary electrical contacts are contained within the plane of the triangle. The balance after the closure can be dynamically maintained by the contact balance springs 28-B which can be compressed with a certain amount of elasticity stored therein and located within the reset button bias member 28. The contact balance springs 28-B also enhance the positive pressure between the electrical contacts after closure and ensure good contacts between the mobile and stationary electrical contacts.

As shown in FIG. 5-1, the reset button 8 includes an extension pointing downward. A nub 41 is provided at the bottom end of the extension. The nub 41 is in contact with a moving arm of the testing switch 37 on the intermediate support 3. The end of the moving arm that comes into a contact with the nub 41 of the reset button 8 can be shaped into a curl 37-A. The first end of the testing switch 37 is coupled to a gate trigger of a SCR on the electrical circuit board 18 via a diode and the second end is coupled to the electrical circuit board 18 via a test resistor.

In FIG. 5-3, in order to provide for emergency operations such as, e.g., a forced electrical output and a forced interruption, the leakage test button 7 can include an extension pointing downwards and sideways to contact a tail end of the latch 30. When a forced electrical output is needed, the leakage test button 7 can be depressed and held at the depressed position, and through the action of the leakage test button 7, the latch 30 can be moved. Afterwards, the reset button 8 can also be depressed and held at the depressed position, causing the directional locks 35 to pass through the openings 31 on the latch 30. When the leakage test button 7 and the reset button 8 are released, the springs 91, 91-A can cause the directional locks 35 to move upwards to couple the mobile electrical contacts on the mobile contact bridges 50, 51 of the reset button bias member 28 to the stationary electrical contacts of the flexible input fingers 20-A, 21-A. Thus, the receptacle device can provide an electrical output. When a forced interruption is required, the leakage test button 7 can be depressed and held at the depressed position to move the latch 30, the directional locks 35 can be released from the openings 31 of the latch 30 and can spring the directional locks 35 upwards. The reset button bias member 28 can move downwards due to gravity and can cause the mobile electrical contacts on the electrical contact bridges 50, 51 to decouple from the stationary electrical contacts on the flexible input fingers 20-A, 21-A. Thus, the electrical output of the receptacle device can be interrupted.

As shown in FIGS. 6-3 and 6-4, the present invention provides a testing switch 37 near a side of the reset button 8 and a test resistor underneath the testing switch 37. The first end of the testing switch 37 can be coupled to a gate trigger of a SCR on the electrical circuit board 18 via a diode and the second end can be coupled to the electrical circuit board 18 via the test resistor. A pair of elastic test button switch pieces 40-A, 40 can be provided underneath the arc fault test button (AT) 7-A and the leakage test button (GT) 7. Test resistors R6, R1 in FIG. 6-3 can be further provided underneath the test button switch pieces 40-A, 40. The first ends of the test button switch pieces 40-A, 40 can be coupled to the receptacle phase line (HOT). The second ends can be suspended and can be coupled to the test resistors. The test resistor R6 beneath the arc fault test button 7-A can be coupled to a control end of the arc fault detection circuit on the electrical circuit board 18. The test resistor R1 underneath the leakage test button 7 can be coupled to a control end of the leakage detection circuit on the electrical circuit board 18. Such a design enables not only the provision of a forced electrical output and a forced interruption, but also the simulations of arc faults and leakage currents for testing the protective features of the receptacle device.

As shown in FIGS. 4, 5-1, 5-2, and 5-3, the electrical circuit board 18 includes a solenoid coil 26 having a plunger 42 therein. One end of the plunger 42 is rest against the top portion of the latch 30. The plunger 42 can produce a dynamic force to push the latch 30 inward to control the switching of an electrical output via the reset button bias member 28.

The receptacle device of the present invention can protect against arc faults and current leakages as follows.

Under normal conditions, as shown in FIGS. 5-1 and 6-1, the reset button 8 is not depressed and there is no contact between the mobile electrical contacts on the mobile contact bridges 50, 51 of the reset button bias member 28 and the stationary electrical contacts on the flexible input fingers 20-A, 21-A, the output conductors 13, 14, and the electrical output leads 80, 81. Since the electrical contacts are not in contact, the directional blocks 35 coupled to the reset button 8 can sit above the latch 30, and the receptacle device does not have an electrical output.

When an electrical output of the receptacle device is required, as shown in FIGS. 5-2 and 6-2, the reset button 8 can be depressed, causing the nub 41 on the extension of the reset button 8 to push the moving arm of the testing switch 37 downward. This leads to the coupling of a pinpoint contact 39 on the testing switch 37 to a status detecting contact 38. If the electrical circuit is operating normally, the leakage detection differential transformer 19 can detect the status and can generate a voltage, in response to which an integrated circuit (IC) can send out a control signal to bias an SCR (see V16 in FIG. 8) into a conducting state, allowing current to flow through the solenoid coil 26. The solenoid coil 26 can then yield a magnetic field, which can move the plunger 42 against the latch 30. The movement of the latch 30 enables the directional locks 35 to pass through the openings 31 of the latch 30. Meanwhile, the reset button 8 can be released, and the pinpoint contact 39 on the testing switch 37 can decouple from the status detecting contact 38. After a half cycle of alternating current change, the SCR can change from a conducting state to an interruption state. The electrical current can no longer flow through the solenoid coil 26 and there can no longer be a magnetic field. The spring 34 between the latch 30 and the reset button bias member 28 can cause the latch 30 to move backwards. The openings 31 of the latch 30 can slip on the locking grooves 36 of the directional locks 35. When the springs 91, 91-A are released, they can rapidly move the reset button bias member 28 upwards, causing the mobile contact bridges 50, 51 of the reset button bias member 28 to move upwards. The mobile electrical contacts on each of the mobile contact bridges 50, 51 can be coupled to the stationary electrical contacts on the flexible input fingers 20-A, 21-A, the output conductors 13, 14, and the electrical output leads 80, 81. The electrical output plugs 5, 6 of the upper cover 2 and the electrical output coupling screws 109, 110 can each have an electrical output, completing the coupling of electricity between the input end and the output end. Thus, the receptacle device can supply an electrical output.

If there is a fault in the circuit loop and the electrical circuit is not operating normally, the integrated circuit (IC) does not send out a control signal and the SCR is not biased into a conducting state. In turn, the solenoid coil 26 is not charged and no magnetic field is generated. The plunger 42 does not move inward against the latch 30, and the directional locks 35 stay above the latch 30. The mobile electrical contacts on the mobile contact bridges 50, 51 do not couple with the stationary electrical contacts on the flexible input fingers 20-A, 21-A, the output conductors 13, 14, and the electrical output leads 80, 81. Thus, the receptacle device does not have an electrical output.

When the leakage detection differential transformer 19 detects leakage currents or the arc sampling resistor L1 detects arc faults, the SCR can be biased into a conductive state, allowing a current to flow through the solenoid coil 26. The solenoid coil 26 can then yield a magnetic field to draw the plunger 42 inward against the latch 30. The latch 30 can move and the locking grooves 36 of the directional locks 35 can slip out from the openings 31 of the latch 30. The reset button 8 springs up due to the actions of the springs 91, 91-A placed on the outsides of the directional locks 35. The reset button bias member 28 can move upwardly to decouple the mobile electrical contacts on the mobile contact bridges 50, 51 from the stationary electrical contacts on the flexible input fingers 20-A, 21-A, the output conductors 13, 14, and the electrical output leads 80, 81. The electrical output plugs 5, 6 of the upper cover 2 and the electrical output coupling screws 109, 110 at the sides of the base 4 do not have an electrical output. The contacts between the electrical input and electrical output can be interrupted.

When the user wants to force an interruption in the electrical coupling between the electrical input and the electrical output of the leakage protecting device, as shown in FIG. 5-3, the leakage test button 7 can be depressed. The leakage test button 7 can cause the latch 30 to move backwards, causing the directional locks 35 to slip out from the openings 31 of the latch 30. The directional locks 35 can spring upwards due to the actions of the springs 91, 91-A and the reset button bias member 28 can move downwards, decoupling the three sets of mobile electrical contacts on the mobile contact bridges 50, 51 from the stationary electrical contacts on the flexible input fingers 20-A, 21-A, the output conductors 13, 14, and the electrical output leads 80, 81. The electrical output plugs 5, 6 of the upper cover 2 and the electrical output coupling screws 109, 110 have no electrical output. The contacts between the electrical input and the electrical output is therefore interrupted.

Figure 8:
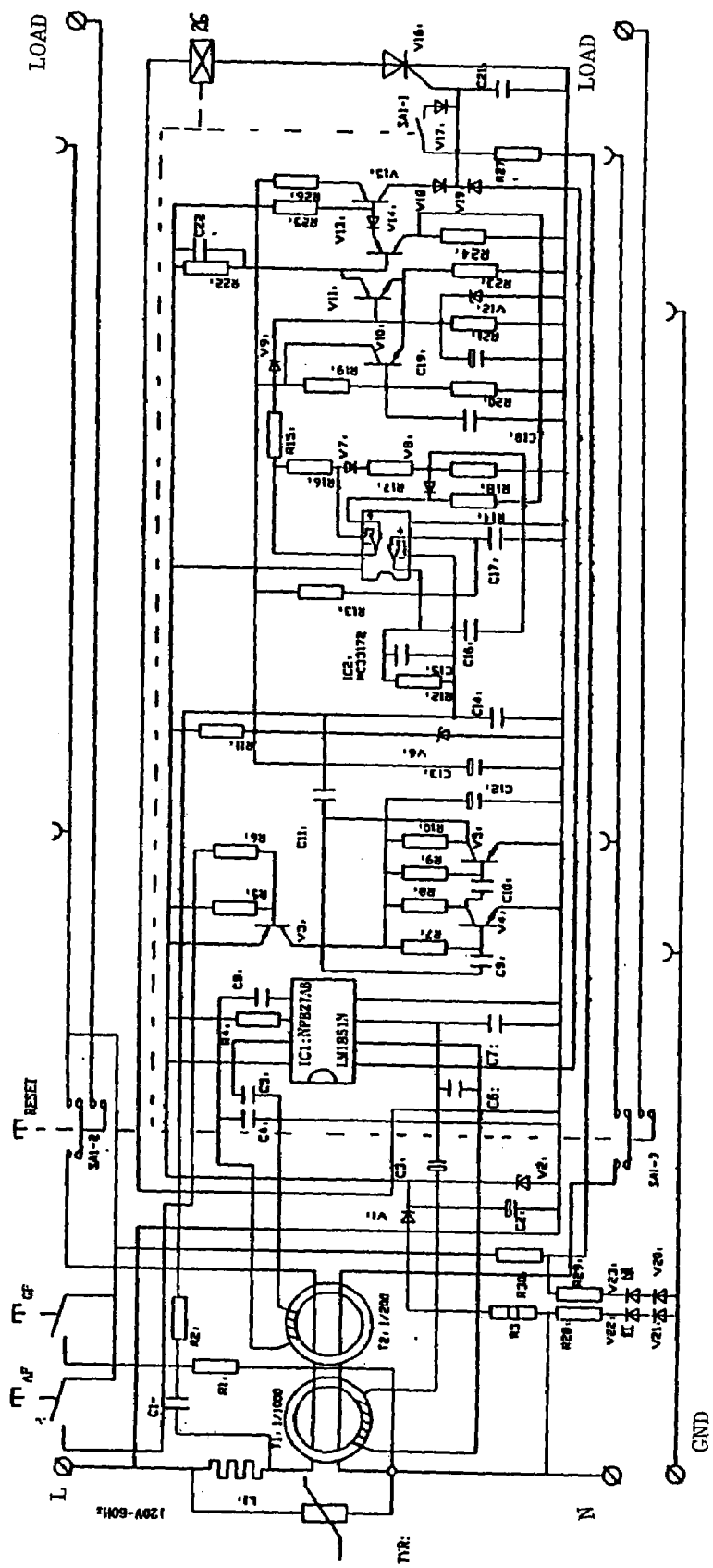
FIG. 8 is a detailed circuit diagram of the exemplary receptacle device.

In FIGS. 7 and 8, the diodes V20, V21, V22, V23 can be linked in series to the electrical input phase line L, neutral line N, and ground line GND to detect whether the wiring of the receptacle device has been properly wired. When the electrical input lines of the receptacle device are properly coupled to the electrical input coupling screws 9, 10 with a correct polarity and the safety ground line is properly coupled, the diodes V20 and V23 can be conductive so that the green light diode V23 lights up to indicate that the receptacle device is ready for use. The receptacle device can have an electrical output. Otherwise, the diodes V21 and V22 can be conductive and the red light diode V22 can light up to indicate that the receptacle device has been improperly wired. The receptacle device cannot be used and does not have an electrical output. This can ensure a proper and safe installation of the receptacle device.

The present invention also employs the arc sampling resistor L1 linked in series in the electrical circuit loop to detect arc faults/signals. The detected arc signal can be amplified and processed by an integrated amplifier IC2 (for example, "MC33172") for switching the SCR V16 on or off. By switching the SCR on or off, an electromagnetic-controlled movement of moving tripping pieces (e.g., the solenoid coil 26 and the plunger 42) can be controlled. The movement of the solenoid coil 26 and the plunger 42 can subsequently control the movement of the reset button bias member 28. Under normal conditions, the six mobile electrical contacts (22, 23, 54, 54-A, 55, 55A) on the mobile contact bridges 50, 51 are coupled to the stationary electrical contacts (15, 16, 53, 53A, 52, 52A) on the flexible input fingers 20-A, 21-A, the output conductors 13, 14, and the electrical output leads 80, 81, and the receptacle device can provide electrical output. When the arc sampling resistor L1 detects an arc fault, the integrated circuit IC2 sends out a control signal to bias the SCR V16 into a conductive state, causing an electromagnetic-controlled movement of the solenoid coil 26 and the plunger 42. This causes a movement of the reset button bias member 28 to decouple the mobile electrical contacts on the mobile contact bridges 50, 51 of the reset button bias member 28 from the stationary electrical contacts on the flexible input fingers 20-A, 21-A, the output conductors 13, 14, and the electrical output leads 80, 81. Thus, the receptacle device discontinues the electrical output.

In detecting leakage currents, the present invention utilizes the leakage detection differential transformer 19, which includes a first differential transformer T1 and a second differential transformer. The first and second differential transformers T1 and T2 can be, for example, a high frequency industrial silicon steel differential transformer and ferrite differential transformer of high frequency, respectively. Any detected leakage current, whether small or large, can be amplified and processed by a ground leakage detection CMOS chip IC1 (for example, "LM1851N"). When a leakage current is detected, IC1 sends out a control signal to bias the SCR V16 into a conductive state, causing an electromagnetic-controlled movement of the solenoid coil 26 and the plunger 42. This in turn causes a movement of the reset button bias member 28 to decouple the six mobile electrical contacts on the mobile contact bridges 50, 51 of the reset button bias member 28 from the stationary electrical contacts on the flexible input fingers 20-A, 21-A, the output conductors 13, 14, and the electrical output leads 80, 81. The receptacle device thus can discontinue the electrical output.

Figure 9:
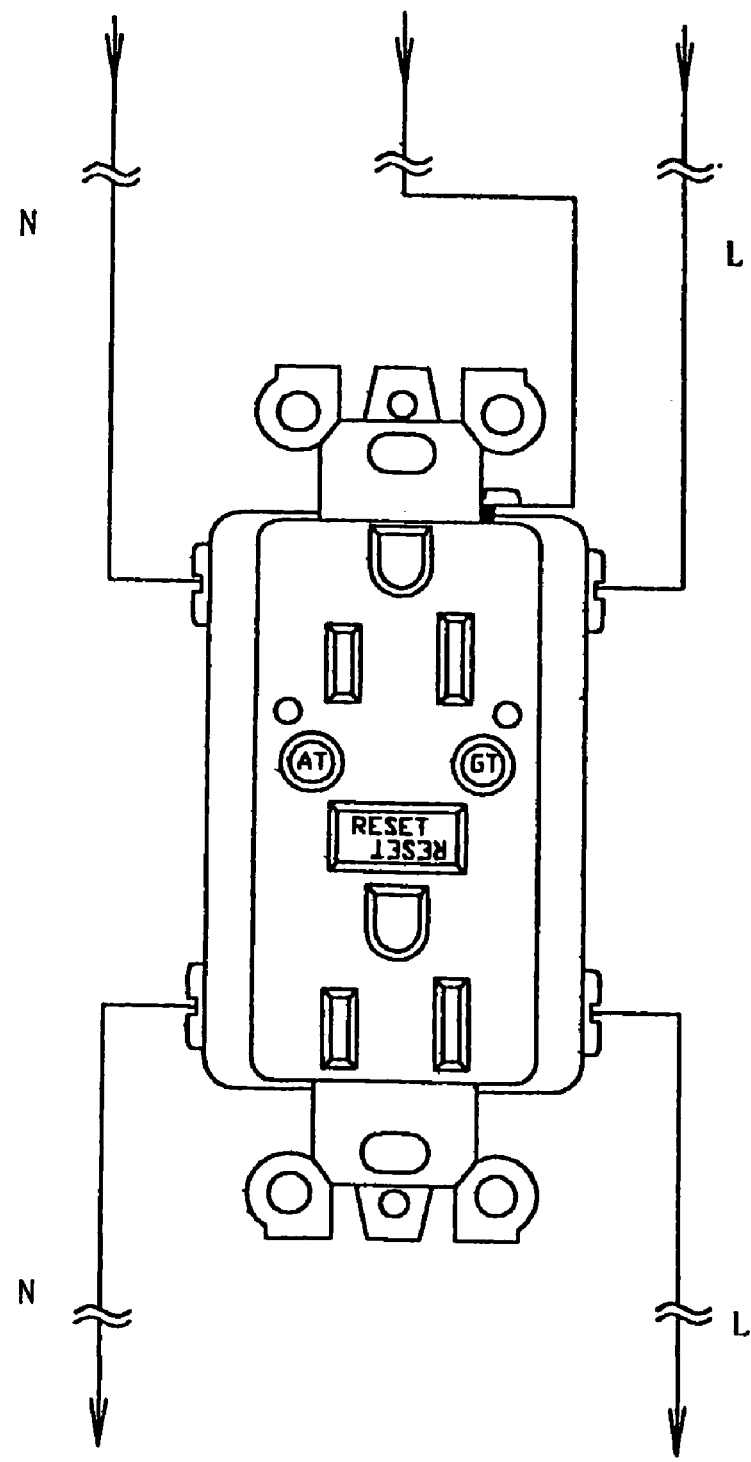
FIG. 9 is a top view of the exemplary receptacle device, showing its wiring.

FIG. 9 is a top view of the exemplary receptacle device according to an exemplary embodiment of the invention, showing its wiring. During installation, the receptacle device can be first coupled to the electrical inputs (i.e., the electrical input phase line L can be coupled to the input lead 24 and secured by tightening the electrical input coupling screw 10 and the electrical neutral line N may be coupled to the input lead 25 and may be secured by tightening the electrical input coupling screw 9). The safety ground line can be coupled and tightened to the ground line input screw 13-A. The reset button 8 can be depressed, the directional locks 35 can start to move downwards, the testing switch 37 and the status detecting contact 38 (i.e., SA1-1) may close to complete the phase detection circuit control loop (see FIG. 8). The electrical current can flow from the phase input line to the input lead 24 (i.e., "HOT" input phase line), to the anode of the uni-directional SCR V16 of the electrical circuit board 18, and to the gate trigger of the SCR V16. The ends of the anode and the gate trigger, that are not coupled to the SCR, can be coupled to an interference-preventing filter capacitor C21, the testing switch 37, the status detecting contact 38 (i.e., SA1-1), the LED V23, the reverse voltage protection diode V20, and the input neutral line screw to form a closed loop.

When the reset button 8 is depressed, the testing switch 37 and the status detecting contact 38 (i.e., SA1-1) can close for a cycle of 20 ms (for AC of 50 Hz, a cycle is 20 ms; for AC of 60 Hz, a cycle is 16.6 ms), and the SCR V16 can be biased into the conductive state during, for example, a negative half cycle. Thus, the solenoid coil 26 coupled to the anode of the SCR V16 in series can be charged and can yield a magnetic field. The plunger 42 can be moved by the magnetic force against the latch 30 to move the latch 30 horizontally. Under the depressing force, the reset button (RESET) 8 can continue to move downwards until the locking grooves 36 of the directional locks 35 move past the openings 31 of the latch 30. The reset button can then be released and, under the actions of the springs 34, 91, 91-A, the latch 30 can rapidly slip on and engage with the locking grooves 36, and the reset button bias member 28 and the directional locks 35 underneath the reset button 8 can be moved upwardly together by the springs 91. Thus, the mobile electrical contacts and the stationary electrical contacts can close completely. This can allow a current to pass through the electrical contacts, enabling the electrical output plugs 5, 6 and the electrical output coupling screws 109, 110 to provide electricity to their respective loads, and can provide a protection against arc faults and leakage currents.

The arc fault detection and the triggering of the protective process are described as follows. When the receptacle device or the load of the coupling screws causes arc faults/signals, the arc signals (e.g., in the form of a current) can pass through the input lead 24 of the receptacle device, the arc sampling resistor L1, the differential transformers T1 and T2, the stationary electrical contacts on the flexible input finger 20-A and the closed mobile electrical contact on the mobile contact bridge 50 to the two mobile electrical contacts on the other end of the mobile contact bridge 50. When there are loads on the electrical output leads and the plugs, the electrical current can split and can flow through the mobile electrical contact 22 and the stationary electrical contact 15 to the load of the plugs and through the mobile electrical contact 55 and the stationary electrical contact 52 to the load of electrical output lead 80. After the electrical current passes through the loads, the electrical current through the load of electrical output lead 80 can flow through the electrical output lead 81, the stationary electrical contact 53 on the electrical output lead 81 and the coupling mobile electrical contact 54 to the mobile contact bridge 51. The current through the load of the plugs can flow through the output conductor 14, the stationary electrical contact 16 on the output conductor 14 and the coupling mobile electrical contact 23 on the mobile contact bridge 51 to the mobile contact bridge 51. The two electrical currents after flowing through the loads can converge at the mobile contact bridge 51 and the combined current can flow through the mobile contact bridge 51, and the coupled stationary electrical contact 53-A on the flexible input finger 21-A to the input lead 25 to form an arc fault circuit.

Because the arc sampling resistor L1 is linked in series in the overall circuit, any large change in signals generated during arc faults (e.g., a large change in magnitudes of currents) can also appear across the arc sampling resistor L1. The control circuit of the present invention obtains an arc signal from these two ends and amplifies the signal to a pre-set value in a first pass through a frequency-filter amplifier including a filter formed of C1, R2, C14, R12, C15 (which can be a low pass filter) and an integrated circuit IC2 (e.g., "MC33172"). After being amplified to a pre-set value, the signal passes for the second time through C16 to IC2 (e.g., "MC33172") for limiting the magnitude of the signal. The purpose is to amplify the true arc signal and can exclude the radiation interference of high frequency electrical current. The arc signal after the aforementioned process can then pass through a primary integrator including R15, V9, C19, R21, and V11 and a secondary integrator including R22, C22, V13 and V14 to a control trigger amplifier V15 of arc signals. The triggering signal of the control trigger amplifier V115 can pass through an isolation diode V18 to the control end of the SCR V16. The SCR V16 can then be placed in a conductive state to charge the solenoid coil 26 and move the plunger 42 against the latch 30. The trip pieces of the receptacle device cause the latch to be released and lead to the loss of electrical outputs at the electrical output plugs and the electrical output coupling screws. Thus, a protection against the detected arc faults can be achieved.

The leakage detection and the triggering of the protective process can be described as follows. When a current leakage signal of the electrical output plugs or the electrical output coupling screws occurs, the differential transformers T1 and T2 at the input end can immediately detect the change of the magnetic field caused by the leakage signal. The leakage signal can pass through the secondary windings of the differential transformers and the capacitors C3, C5, C8, coupled to the ground fault integrated circuit IC1 (e.g., "LM1851"). After being processed, the leakage fault signal can pass through a leg of the integrated circuit to the isolation diode V19, then to the control end of the SCR V16. The SCR V16 can then be placed in a conductive state, charging the solenoid coil, moving the plunger 42 against the latch 30, further causing the trip pieces of the receptacle device of the present invention to release the latch, and can lead to the loss of electrical current at the electrical output plugs and the electrical output coupling screws. Thus, the protective function against the current leakage can be achieved.

The phase/polarity test and the detection of unsafe ground coupling are described as follows. In the exemplary receptacle device of the present invention, the electrical circuit for the phase test and detection of unsafe ground coupling includes a ground test circuit including R28, V22, and V21. If the exemplary receptacle device is properly installed, the voltage difference between the neutral line and the safety ground line is 0 V, and the indicator light V22 is unlit. If the ground line is mis-wired to the phase line, the voltage between the ends of the detection circuit of R28, V22 and V21 is 220 V (or 120 V) and the indicator light V22 is lit. The indicator light V22 can be a phase indicator. The electrical circuit for detection of safe ground coupling can include R30, R29, an indicator light V23, and V20. When the coupling of the ground line is missing, the electrical circuit is suspended and no electrical current can flow through. The control circuit is in the standby state. When the zero line is properly coupled, the voltage difference between the two ends of the detection circuit of safe ground coupling (i.e., R30, R29, an indicator light V23, and V20) is 0 V before being reset. When the reset button is reset, the coupled testing switch SA1-1, 39 and 38 is closed. The detection circuit of safe ground coupling (e.g., R29, an indicator V23, V20), R27, SA1-1, 39, 38, V17, and the control end of SCR V16 can conduct electricity therethrough and the indicator light V23 is lit. The SCR V16 can be placed in a conductive state and can thereby charge the solenoid coil 26 which causes the plunger 42 to move against the latch 30. This can cause the trip pieces of the exemplary receptacle device to open up (i.e., the openings 29 of the reset button bias member 28 becomes aligned with openings 31 of the latch and allows the directional locks 35 to move downwardly). The reset button can be reset. The output ends and the electrical output plugs of the present invention have normal electrical outputs. During reset, the voltage is 220 V (120 V) and the indicator light V23 is lit.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described exemplary embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A receptacle device for protection against arc faults and leakage currents comprising:
   an upper cover;
   an intermediate support;
   a base;
   a mounting strap installed between said upper cover and said intermediate support;
   an electrical circuit board installed between said intermediate support and said base; and
   a pair of column-shaped directional locks, each having a spring wrapped around an outside of said directional lock and a locking groove formed near a bottom of said directional lock, wherein
      said upper cover comprises electrical output plugs, an arc fault test button, a leakage test button and a reset button, wherein said arc fault test button, said leakage test button and said reset button pass through said mounting strap, said electrical output plugs comprising phase line openings and neutral line openings;
      said mounting strap comprises ground points and, at one side of said mounting strap, a ground line input screw, wherein said ground points are safety ground receptacles of said electrical output plugs,
      said intermediate support comprises a pair of output conductors, wherein said output conductors comprise conductive members and stationary electrical contacts, said conductive members correspond to said phase line openings and neutral line openings of said electrical output plugs, and said stationary electrical contacts are substantially similar and are symmetrically situated,
      said base comprises a symmetrically situated pair of electrical input coupling screws, pair of electrical output screws and pair of electrical output leads, wherein said base encloses said intermediate support and said electrical circuit board, said electrical output leads are coupled to said electrical output screws, and said electrical output leads comprise stationary electrical contacts,
      said electrical circuit board comprises a pair of flexible input fingers, a differential transformer to detect a current leakage, an arc sampling resistor to detect an arc fault, a reset button bias member, a solenoid coil having a plunger therein, and a horizontal, electromagnetic latch, wherein said pair of flexible input fingers are coupled to said electrical input coupling screws and each of said flexible input fingers comprises a stationary electrical contact,
      said flexible input fingers pass through said differential transformer,
      said arc sampling resistor is linked in series with at least one of said input coupling screws,
      said reset button bias member is located below said reset button and comprises mobile contact bridges as its two arms, and two central openings extending from a top of said reset button bias member, wherein said central openings house said pair of column-shaped directional locks, said directional locks are coupled to a bottom of said reset button, said horizontal, electromagnetic latch is arranged below said directional locks and near a bottom of said central openings, said latch comprises two openings corresponding to said directional locks, wherein a spring is provided between one side of said reset button bias member and said latch, and said plunger rests against a top portion of said latch,
      each of said mobile contact bridges of said reset button bias member has three triangularly spaced electrical contacts, wherein one electrical contact is coupled to the stationary electrical contact on a respective flexible input finger, wherein the other two electrical contacts are coupled to said stationary electrical contacts on a respective output conductor of said intermediate support and a respective electrical output lead of said base to control an electrical supply of said electrical output plugs on said upper cover and said electrical output leads.

2. The receptacle device according to claim 1, wherein said intermediate support comprises a testing switch, said reset button comprises an extension pointing downwards and a nub at a bottom end of said extension, wherein said nub is in contact with a first end of a moving arm of said testing switch and said first end of said moving arm is shaped into a curl, and
   a test resistor is provided below said testing switch, wherein one end of said testing switch is coupled to components controlling a switching of a current through said solenoid coil and a second end of said testing switch is coupled to said electrical circuit board through said test resistor.

3. The receptacle device according to claim 2, wherein said leakage test button comprises an extension extending downwards and sideways, wherein said extension is in contact with a tail of said latch.

4. The receptacle device according to claim 3, wherein
a pair of elastic test button switch pieces are provided below said arc fault test button and said leakage test button, wherein a test resistor is further provided below each of said test button switch pieces, first ends of said test button switch pieces are coupled to said plug phase line, and second ends of said test button switch pieces are suspended for subsequently being coupled to said test resistors, said test resistor below said arc fault test button is coupled to a control end of an arc fault detection circuit on said electrical circuit board and said test resistor below said leakage test button is coupled to a control end of a leakage detection circuit on said electrical circuit board.

5. The receptacle device according to claim 4, wherein
an upper portion of said directional locks has a diameter slightly larger than a diameter of a lower portion of said directional locks, said horizontal, electromagnetic latch latches onto said directional locks, said springs of said directional locks comprise lower portion springs wrapped around said lower portion of said directional locks, wherein said lower portion springs cause said reset button to spring up after said latching by said latch is released.

6. The receptacle device according to claim 5, further comprising
a pair of compressed contact balance springs having elasticity stored therein and being provided within said reset button bias member at positions below gravity centers of said mobile contact bridges.

7. The receptacle device according to claim 6, wherein said differential transformer comprises a high frequency industrial silicon steel differential transformer and a ferrite differential transformer of high frequency.

8. The receptacle device according to claim 7, wherein said upper cover further comprises indicator lights coupled to said electrical circuit board.

9. A receptacle device for protection against arc faults and leakage currents comprising:
an upper cover comprising electrical output plugs, an arc fault test button, a leakage test button and a reset button, said electrical output plugs comprising phase line openings and neutral line openings;
a base comprising a pair of electrical input couplings;
electrical circuit components coupled to said electrical input couplings and electrical output plugs for detecting an arc fault and a leakage current;
an electromagnetic latch, said electrical circuit components outputting a signal to said electromagnetic latch to control said electromagnetic latch,
a pair of locks coupled to said reset button, said electromagnetic latch performing at least one of latching onto and releasing said pair of locks; and
a reset button bias member located below said reset button and comprising two central openings extending from a top of said reset button bias member, wherein each of said central openings houses a respective one of said pair of locks and depressing said reset button causes said electromagnetic latch to latch onto said pair of locks and electrically couple said electrical input couplings to said electrical output plugs.

10. A receptacle device for protection against arc faults and leakage currents comprising:
an upper cover comprising electrical output plugs, an arc fault test button, a leakage test button and a reset button, said electrical output plugs comprising phase line openings and neutral line openings;
a base comprising a pair of electrical input couplings;
electrical circuit components coupled to said electrical unput couplings and electrical output plugs for detecting an arc fault and a leakage current;
an electromagnetic latch, said electrical circuit components outputting a signal to said electromagnetic latch to control said electromagnetic latch,
a pair of locks coupled to said reset button, said electromagnetic latch performing at least one of latching onto and releasing said pair of locks; and
a reset button bias member located below said reset button and comprising two central openings extending from a top of said reset button bias member, wherein each of said central openings houses a respective one of said pair of locks and depressing said reset button causes said electromagnetic latch to latch onto said pair of locks and electrically couple said electrical input couplings to said electrical output plugs,
wherein said leakage test button comprises an extension extending downwards and sideways, wherein said extension is in contact with a tail of said electromagnetic latch.

11. The receptacle device according to claim 10, wherein depressing said leakage test button controls said electromagnetic latch to release said pair of locks and electrically decouple said electrical input couplings from said electrical output plugs.

12. The receptacle device according to claim 9, wherein said electrical circuit components control said electromagnetic latch to release said pair of locks when said electrical circuit components detect at least one of said arc fault and said leakage current.

13. The receptacle device according to claim 9, wherein said pair of locks are column-shaped directional locks.

14. A receptacle device for protection against arc fault and leakage currents comprising:
an upper cover comprising electrical output plugs, an arc fault test button, a leakage test button and a reset button, said electrical output plugs comprising phase line opening and neutral line openings;
a base comprising a pair of electrical input couplings;
electrical circuit components coupled to said electrical input couplings and electrical output plugs for detecting an arc fault and a leakage current;
an electromagnetic latch, said electrical circuit components outputting a signal to said electromagnetic latch to control said electromagnetic latch,
a pair of locks coupled to said reset button, said electromagnetic latch performing at least one of latching onto and releasing said pair of locks; and
a reset button bias member located below said reset button and comprising two central openings extending from a top of said reset button bias member, wherein each of said central openings houses a respective one of said pair of locks and depressing said reset button causes said electromagnetic latch to latch onto said pair of locks and electrically couple said electrical input couplings to said electrical output plugs,
wherein each of said pair of locks comprises a spring wrapped around its outside surface.

15. A receptacle device for protection against arc fault and leakage currents comprising:
an upper cover comprising electrical output plugs, an arc fault test button, a leakage test button and a reset button, said electrical output plugs comprising phase line openings and neutral line openings;

a base comprising a pair of electrical input couplings;

electrical circuit components coupled to said electrical input couplings and electrical output plugs for detecting an arc fault and a leakage current;

an electromagnetic latch, said electrical circuit components outputting a signal to said electromagnetic latch to control said electromagnetic latch, a pair of locks coupled to said reset button, said electromagnetic latch performing at least one of latching onto and releasing said pair of locks; and a reset button bias member located below said reset button and comprising two central openings extending from a top of said reset button bias member, wherein each of said central openings houses a respective one of said pair of locks and depressing said reset button causes said electromagnetic latch to latch onto said pair of locks and electrically couple said electrical input couplings to said electrical output plugs, wherein said electromagnetic latch has two openings, each opening engaging a groove formed on a respective one of said pair of locks.

* * * * *